UNITED STATES PATENT OFFICE 1,985,846

ART OF COATING FRESH FRUIT IN PREPARATION FOR MARKET

Miles L. Trowbridge, Pomona, Calif., assignor to Brogdex Company, Los Angeles, Calif., a corporation of Florida No Drawing. Application August 28, 1929, Serial No. 389,099

4 Claims. (Cl. 99—8)

This invention relates to art of coating fresh fruit in preparation for market; and it relates more particularly to the provision on fresh fruits of a surface coating in the form of an extremely thin continuous film of material comprising essentially a suitable vegetable or animal fat, either alone or in association with an admixed substance of oily or waxy nature adapted to modify the physical characteristics of said fat in a manner desirable for attainment of the purposes in view.

Protective coating of fresh fruit of various kinds for the purpose of maintaining it plump and substantially unwithered over relatively long marketing periods and of otherwise improving its marketability has been developed only within recent years to a point where it is practical, but it is now standard practice with many packers of citrus fruits, such as oranges, grapefruit, and lemons; as well as of apples, pears and other deciduous fruits. The coating material used has been paraffin wax, employed either alone or in mixture with a mineral oil solvent or vehicle to facilitate uniform distribution over the surface of the fruit. As a rule, paraffin wax has proved satisfactory for the purpose, especially when applied and spread in molten condition without the aid of a solvent.

Under some circumstances, however, it would be desirable to use a coating material which is partly or even wholly non-mineral in character. Edible oils or fats of animal or vegetable origin would be especially advantageous in this connection. But the use of such materials has been considered impracticable heretofore either because of a tendency, in the case of hard fats, to flake off instead of adhering properly to the surface of the fruit, or because of an unduly greasy feel imparted to the fruit, or liability of the fat to become rancid. These and other objections have heretofore militated against the use of non-mineral oils or fats for coating fresh fruit.

In accordance with the present invention in one of its important practical embodiments, the objections above mentioned may be overcome by employing oils or fats that have been artificially hardened by hydrogenation in known manner, and applying such hardened oils to the fruit under conditions ensuring their proper adherence to the fruit. Among numerous products of this character suited to the practice of the invention may be mentioned hardened (hydrogenated) cottonseed, castor, sesame, soya bean, peanut, cocoanut, corn and fish oils, as well as hardened palmitin, stearin, and olein. If these are to be used alone, without admixture of a softening or tempering agent such as a liquid oil or softer fat to reduce brittleness, it is ordinarily desirable that the hardening or hydrogenation shall not have been carried to completion, although it should have been carried sufficiently far to ensure a reasonable degree of chemical stability of the fat and absence of any pronounced odor or tendency to become rancid. In general, it is most desirable to employ a fat having a melting point of at least about 115° F., and a melting point of 130° F. or even somewhat higher is usually still better. For example, a hardened cottonseed oil typically useful in practicing the invention may have a melting point of 62° C. (143° F.). Castor oil, cocoanut oil, and peanut oil in particular yield, upon appropriate hydrogenation, hardened oils which are especially suitable because of their waxy and relatively tough consistency which favors continuity of film and tenacious adherence to the surface of fruit.

Where the fat is so hard and brittle that it does not adhere well to the surface of fruit but tends to flake off, the employment of an admixed tempering or softening substance is advisable. This tempering substance may be either oleaginous or waxy, or both. For instance, blending a moderately soft wax, such as Japan wax or paraffin wax, with a hard fat gives a composition that is tougher, more adherent, and better suited generally for coating fruit than is a hard brittle fat by itself. The proportion of wax thus added may vary considerably depending upon the kind of fruit to be coated and the particular character of coating desired, and in practice it may constitute from, say, 10 to 90 per cent of the finished composition. In place of, or in addition to, the relatively soft wax, a lesser proportion of cottonseed, sesame, or other oil may be incorporated with the hardened oil to reduce brittleness. In some cases, a fat which is naturally relatively hard and high-melting may be used wholly or partly in place of the artificially hardened oil or fat. Thus, a mixture of naturally hard beef tallow and sesame oil gives a coating mixture of good characteristics. Such compositions may also include a minor proportion of a relatively hard high-melting wax, such as carnauba wax, china wax or Montan wax, where it is desired that the coating on the fruit be capable of taking a higher luster or polish upon rubbing.

In another practical embodiment of the invention, naturally soft fats or oils of vegetable or animal origin may be mixed or blended (without artificial hardening) with relatively hard, high-melting waxes, such as those just mentioned, to provide compositions that work well in coating fruit. Examples of such soft fats and oils are palmitin, stearin and olein. Generally speaking, the soft fat or oil should constitute less than 50 per cent of the mixture, although this is not an invariable rule. Where carnauba wax is employed, as the high-melting waxy constituent, the available commercial grades, known as No. 1 Yellow and No. 2 North Country, melting at around 82° to 85° C. (180°–185° F.) are suitable. If Montan wax is used, it is preferable to employ the bleached grade. Another hard wax suitable for the purpose, in addition to those already mentioned, is candelilla wax, a typical commercial grade of which melts at around 73° C. (163° F.). By suitable refining treatment to eliminate resinous impurities, such tendency toward slight tackiness or stickiness as may characterize coatings in which ordinary commercial candelilla wax is used, may be obviated.

It is also sometimes advantageous to employ paraffin wax or other mineral wax, as heretofore, as the main solid constituent or basis of the coating composition, but to employ an unhardened non-mineral oil, such as sesame or cottonseed oil, in association therewith in place of the mineral oil formerly so employed occasionally. In addition to the fact that the oily vehicle is an edible oil, the further advantage is gained in this, as in all the other compositions whose use characterizes the present invention, that the coating composition or mixture is at least partially saponifiable. The importance of this will appear presently.

In still another embodiment of the broad invention, a non-mineral oil or fat which has been artificially hardened to a melting point above ordinary atmospheric temperatures, or which is naturally of that character, may be mixed with a volatile solvent, such as gasoline, petrolic ether, carbon tetrachloride, or the like, and the fluent mixture spread over fruit, the solvent being wholly or largely evaporated in the course of the operation or subsequently, leaving a thin film coating of solid or non-fluent coating material on the fruit. Softening or tempering agents of oily or waxy nature may of course be incorporated in the mixture in this case also. Mixtures which include a volatile solvent are ordinarily less desirable for use in practicing the present process than those containing none.

In coating fruit with any of the described compositions in accordance with the principles of the invention, a good practical procedure is to apply a small quantity of the composition to each fruit and then to rub the entire surface of the fruit briskly in order to distribute the coating material uniformly over the fruit surface in a continuous film coating of extreme thinness. Most desirably this rubbing is accomplished in an environment heated sufficiently to ensure free fluidity of the coating material, and the rubbing is continued for a substantial period of time under these conditions, whereby the film coating is made to contact intimately with every part of the fruit surface and adhere firmly thereto. Where the mixture consists largely of a hard or hardened oil or fat, with or without an associated wax, the rubbing is best accomplished in an environment maintained at a temperature well above the melting point of the solid or solids present. As a rule, a temperature of at least 150° F. is advisable, and as high as 200° to 220° F. is still better, the temperature being observed at a point closely adjacent the rubbing or brushing element employed; and continuance of the rubbing for around 10 to 30 seconds at such temperatures is to be recommended. Types of apparatus which may be used in carrying out the process are disclosed in patents to Brogden Nos. 1,641,112 and 1,671,924, for example, the parallel brush-roll apparatus of the latter patent being especially well adapted for present purposes because it permits adjustable control of the speed at which the fruit passes through the brushing runways.

As regards the quantity of coating material to be applied to the fruit, this is not rigidly limited but may be varied within reasonably wide limits, having in mind the character of the particular coating material used and the practical requirement that, while enough should be used to produce a coating sufficiently thick to reduce withering substantially, breathing of the fruit must not be unduly interfered with. In general, it is found that, on the average, application of from 1½ to 3 pounds of coating material (non-volatile) per 100 standard boxes or crates of oranges, for example, gives good results, this quantity including wastage which, however, is usually slight where the treatment is conducted properly in well designed brushing apparatus of the type indicated.

Employment of coating compositions of the character herein described, in preparing fresh fruits for market, is especially effective and advantageous when the application of the composition is preceded by treatment of the fruit with an alkaline agent, most desirably in warm aqueous solution. Such treatment renders the skin of the fruit particularly receptive to the oleaginous or fatty coating compositions herein referred to and enhances the closeness of contact and coherence between the coating and the surface of the fruit. When the alkaline treatment is such as to leave a distinct alkaline residue on the surface of the fruit, good adherence of the coating is especially furthered because of the saponifying action of the alkaline agent upon the saponifiable constituents of the coating mixture which occurs to a slight extent even with a relatively mild alkaline agent, particularly when the spreading of the mixture over the surface of the fruit is accomplished by rubbing in a heated environment for an appreciable period of time, as already described hereinabove. Examples of alkaline agents suitable for this purpose are those which are very mildly alkaline and non-caustic, such as borax, as well as relatively strong alkalies, such as soda ash (commercial anhydrous sodium carbonate), caustic soda (sodium hydroxide), and the like. In using strongly caustic alkalies, such as sodium or potassium hydroxide, it is of course necessary to take suitable precautions against injuring the surface of the fruit through employment of too concentrated solutions or unduly prolonged contact of the fruit with the solutions at the treating temperatures employed. These alkaline agents when employed under proper conditions, especially borax and suitable mixtures thereof with the relatively strong alkalies, are effective in controlling blue mold decay in citrus and other fresh fruits. Therefore, where fruit is subjected to treatment therewith for decay control the succeeding application of shrinkage-retarding compositions saponifiable at least in part, in accordance with the present invention, obviously affords important advantages.

The term "fat" as employed in the appended claims is to be understood, unless otherwise indicated, in a generic sense to include both fats ordinarily so-called and also oils.

What is claimed is:

1. The process of protectively coating fresh fruit which comprises applying an alkaline agent to the fruit and then spreading over the fruit coating material comprising a saponifiable constituent.

2. The process of protectively coating fresh fruit which comprises applying an alkaline agent to the fruit and then spreading over the fruit oleaginous coating material comprising a saponifiable constituent.

3. The process of protectively coating fresh fruit which comprises applying an alkaline agent to the fruit and then spreading over the fruit with the aid of heat coating material comprising a saponifiable constituent.

4. The process of protectively coating fresh fruit which comprises applying an alkaline agent to the fruit and then spreading over the fruit coating material comprising a vegetable fat by rubbing the fruit in a heated environment.

MILES L. TROWBRIDGE.